United States Patent
Greis

[15] 3,682,094
[45] Aug. 8, 1972

[54] CLAD METAL MEMBER
[72] Inventor: Paul F. Greis, Thiensville, Wis.
[73] Assignee: Metal Processing Co., Inc., Milwaukee, Wis.
[22] Filed: May 21, 1970
[21] Appl. No.: 39,424

[52] U.S. Cl. .................101/375, 29/130, 29/132
[51] Int. Cl. .................................................B41f 13/20
[58] Field of Search ......101/375, 401.1; 29/132, 130

[56] References Cited

UNITED STATES PATENTS

| | | |
|---|---|---|
| 2,034,599 | 3/1936 | Van Marle.............29/132 X |
| 3,416,435 | 12/1968 | Dahl et al. ............29/132 X |
| 3,361,063 | 1/1968 | Thorpe et al. .......101/401.1 X |
| 3,019,511 | 2/1962 | Hornbostel............29/132 X |
| 1,750,562 | 3/1930 | Allman.....................101/395 |
| 3,490,119 | 1/1970 | Fukuyama et al. ..........29/132 |
| 1,971,044 | 8/1934 | Lewis....................101/401.1 |

FOREIGN PATENTS OR APPLICATIONS 986,734   3/1965   Great Britain..............29/132

Primary Examiner—Clyde I. Coughenour
Attorney—Andrus, Sceales, Starke & Sawall

[57] ABSTRACT

A clad printing drum for offset printing apparatus includes a cast iron or aluminum base to which a stainless steel cover is attached by an epoxy adhesive. A sheet of the epoxy is applied to the base. A spacing member formed of fiberglass strands and nylon strands is disposed over the covered base. An outer sheet of epoxy is applied over the spacing tube. The stainless steel cover is wrapped about the outer sheet with an outer clamping band to apply a predetermined pressure clamping of the epoxy and interposed spacing member. The clamped assembly is heated to cause the resin to flow and cure while under the pressure of the clamping means.

4 Claims, 5 Drawing Figures

INVENTOR.
Paul F. Greis

BY

Attorneys

CLAD METAL MEMBER

BACKGROUND OF THE INVENTION

This invention relates to a clad metal member such as a drum unit employed in offset printing apparatus or the like and to a method of making the clad metal member.

Metal members may be employed in various applications where a particular outer metal surface of a relatively expensive metal is required or desirable. In order to minimize the cost of the apparatus, a clad member is used with a base or supporting metal formed of a relatively inexpensive metal and with the outer surface covered with the desired metal surface through a suitable bond between the two members. For example, offset printing apparatus and the like may employ a rotating roll or drum structure for transferring of the printing ink onto a printing plate which is subsequently employed to transfer the information to the paper. The drum is generally formed with an inexpensive base metal member, such as a cast iron member with the exterior peripheral surface being chromium plated because of the desirable wetting characteristics and acid resistance of chromium. Stainless steel also has the necessary characteristics. A drum of stainless steel would be prohibitively expensive and a satisfactory method of cladding an inexpensive base metal has not been available.

Further, the present plated drums are relatively expensive. The base metal must be prepared without surface voids or openings. The base metal member, after forming, is checked and if voids are present, the member is drilled and plugged. The base member is normally ground to a given tolerance. The grinding may cover small voids which appear later in the plated drum, resulting in the necessity to scrap the unit. Once the drum has been plated, it cannot be economically reclaimed if, for any reason, the outer clad member is not properly applied, or is subsequently damaged during handling or the like. Thus, the drum must, in the first instance, be very carefully constructed with the resulting greater cost or adverse waste results. Further, after predetermined use, the same drum cannot be reclad.

The prior art structures, although satisfactory in many respects, do have, therefore, certain distinct disadvantages from the standpoint of economics and mass production.

SUMMARY OF THE PRESENT INVENTION

The present invention is particularly directed to an improved cladding method and structure which has been particularly adapted to a clad printing drum or roll for a printing apparatus and the like.

Generally, in accordance with the present invention, the stainless steel cover is secured to the base metal through a suitable adhesive and which, for optimum life and bonding, is an epoxy resin. Applicant has found that by maintaining the cleanliness of the respective surfaces and by selection and application of an epoxy resin or the like, a highly satisfactory and improved bond can be established between a cast iron base metal and a stainless steel cover which, in a clad drum, will withstand the normal operating application in printing apparatus.

In accordance with a particularly novel aspect of the present invention, applicant has found that a very accurate and relatively close initial tolerance of the outer clad cover is established by interposing a plurality of spacing elements within the adhesive during the curing process to thereby accurately locate the outer clad member with the resulting very minimal amount of grinding required. In particular, as applied to a printing drum roll, applicant has found that a highly novel and satisfactory result is obtained by first applying a thin film or cover in the form of a sheet of a suitable resin, such as an epoxy, to the base drum surface. A knit member, which for optimum results is formed of fiberglass and nylon strands, is then disposed over the covered base drum. An outer film or cover of the same resin is applied over the spacing member after which the cladding metal is applied. A pressure means, such as a clamping band, is then wrapped about the drum structure to apply a predetermined pressure clamping of the adhesive resin and interposed spacing member onto the drum surface. The clamped assembly is then heated to cause the epoxy to flow and cure while under the pressure of the clamping means. Applicant has found that this results in a highly satisfactory bonding of the stainless steel cover to the base drum with the outer surface held within a predetermined minimum cylindrical tolerance such that a very minimal amount of machining or grinding is required. Furthermore, the drums can be reprocessed and reclad if an error has been made in the original cladding as well as after the drum surface is worn to the extent that they no longer operate properly.

The present invention is directed to a novel cladding structure and method and particularly a highly improved clad drum structure and the like which is adapted to mass production at relatively low cost.

BRIEF DESCRIPTION OF DRAWING

The drawing furnished herewith illustrates the best mode presently contemplated by the inventor for carrying out the subject invention defined herein and clearly discloses the above advantages and features as well as others which will be readily understood by those skilled in the art by the following description of such illustrated embodiment.

In the drawing.

DESCRIPTION OF ILLUSTRATED EMBODIMENT

Figure 1:
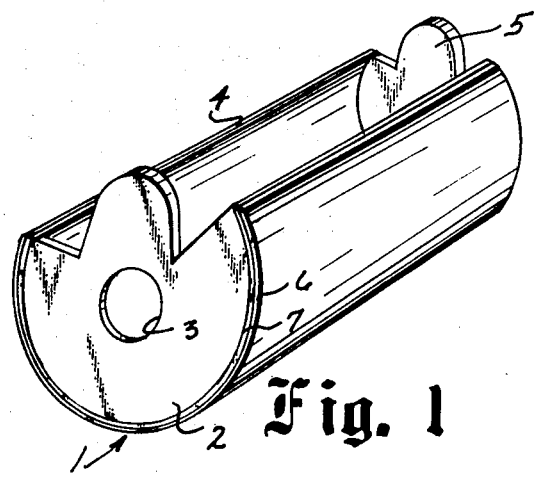
FIG. 1 is a pictorial view of a printing drum or roll constructed in accordance with the present invention.
Figure 2:
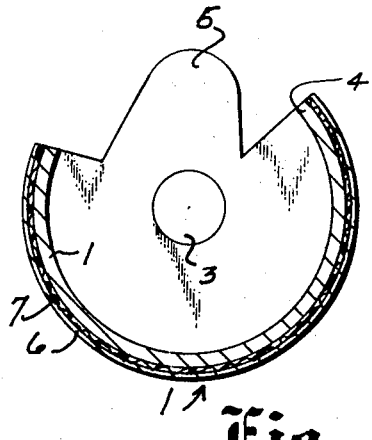
FIG. 2 is an enlarged vertical section through the drum structure of FIG. 1 more clearly illustrating the clad structure.
Figure 3:
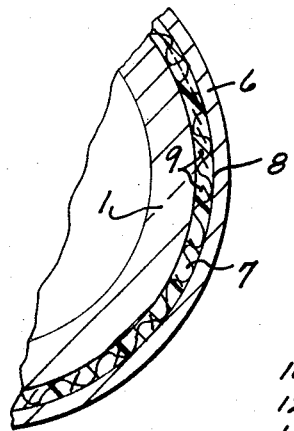
FIG. 3 is an enlarged fragmentary view more clearly showing the clad structure.

Referring to the drawing, and particularly to FIGS. 1 and 2, a print inking drum or cylinder, such as employed in offset presses is illustrated, including an inner supporting base drum 1 which may be formed of a relatively inexpensive metal, such as cast iron, cast aluminum or the like, and which is of a suitable strength to form a rotating support. The drum 1 is provided with opposite integral end members or walls 2 having a suitable shaft opening 3 for receiving a supporting shaft unit, not shown. The periphery of the drum 1 is partially removed to form a clamping opening spanning a portion thereof and defining longitudinal edge means 4 which slant inwardly generally radially of the drum 1. The end walls 2 are correspondingly notched to define ears 5. An outer peripheral metal cover 6 is secured to the peripheral surface of the drum 1 in accordance with the present invention by a suitable plastic adhesive 7. A spacing member or unit 8 is interposed between drum 1 and cover 6 and embedded within the adhesive 7 to accurately space the cover 6 from the drum 1. The spacing unit 8 is formed of a plurality of individual crisscrossed spacing strands or elements 9 in accordance with the illustrated embodiment of the present invention to permit a firm bonding of the cover 6 to the drum 1 while accurately locating of the cover 6 with respect to the drum 1. This has been found to provide a very reliable, simple and inexpensive means of permitting adhesive plastic bonding of a 302 stainless steel cover 6 to a cast iron drum 1. The structure has been particularly adapted to offset printing drums. The spacing unit 8 is preferably a knit-type structure with the spacing elements 9 interwoven in a relatively close-knit fabric.

In accordance with a particularly novel aspect of the present invention, the clad cover 6 is applied and bonded to the surface of the drum 1 as follows.

The iron drum is formed with a suitable degree of roundness and the outer surface is suitably cleaned.

Figure 4:
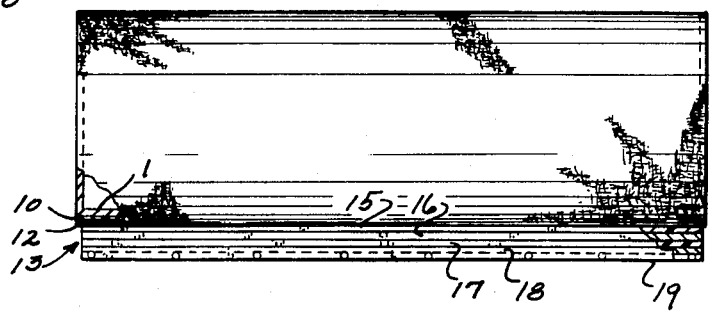
FIG. 4 is a side elevational view of an assembly showing one step of the process and with a curing heat source diagrammatically shown as subsequently located into the assembly.
Figure 5:
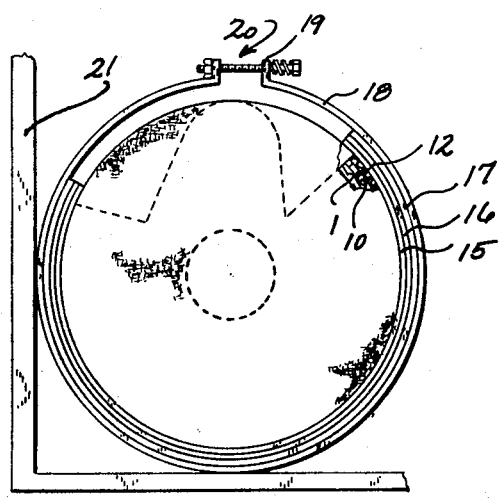
FIG. 5 is an end view of the wrapped assembly during the curing process.

A plastic adhesive sheet 10 is wrapped over the face of the drum 1, as shown in FIGS. 4 and 5. In connection with a cladding of a printing drum, applicant has employed an epoxy film. A highly satisfactory epoxy is sold in sheet form by Minnesota Mining & Mfg. Co. of St. Paul, Minn. and identified as "3M Adhesive Film, AF-42."

After application of the adhesive film or sheet 10, a member 12, forming the spacing unit 8, is applied over the adhesive-covered drum, as shown most clearly in FIG. 5. The member 12 is shown as an interwoven knit structure formed of strands of fiberglass and nylon and which has been found to advantageously include a predominant amount of fiberglass.

After the application of the spacing member 12, the assembly is placed on a final adhesive layer cladding assembly 13 including an adhesive sheet 15 as a first or top layer. Sheet 15 corresponds to the material of the inner sheet 10, or is otherwise totally compatible therewith to form an integral single-ply bonding mass in the final product.

The film sheet 15 is of a sufficient length such that when wrapped around the tubular enclosed drum, it will extend slightly beyond the edges, as shown in FIG. 5. A stainless steel cladding or cover sheet 16 is disposed immediately beneath the film sheet 15. The sheet is preferably a 302 stainless steel or the like if applied to a printing unit.

The stainless steel sheet 16 is preferably pickled and vapor-degreased as a safety precaution to insure accurate bonding. It is important that the surface facing and mating with the epoxy film 15 is not touched after the cleaning, as it might adversely affect the bonding characteristic.

The stainless steel cladding sheet 16 rests on a suitable resilient pad 17 which may be formed of silicone rubber or the like. In a practical application, a one-eighth inch thick silicone rubber pad was employed which extended slightly beyond the peripheral edges of the cover sheet 16. The total assembly rests on a bottom clamping band 18 formed of a suitable flexible metal.

In the illustrated embodiment of the invention, the total assembly is wrapped about the covered drum with the outer ends of the band 18 slightly spaced from each other and overlying the drum opening 3. The outer ends of the band 18 are provided with interconnecting securement means, such as apertured block members 19 through which a plurality of interconnecting spring-loaded bolts 20 or the like are applied and drawn up to tightly wrap the assembly about the drum under a desired pressure. The clamping band 18 is preferably formed with a plurality of circumferentially extending slits to provide a more uniform pressure distribution throughout the surface and the like.

After clamping of the assembly, the assembly is heated in any suitable means; for example, by mounting one or more of the assemblies within a suitable heating enclosure 21, only partially shown. The heating raises the temperature of the unit such that the epoxy films 10 and 15 flow into each other, completely filling the openings within the spacing element and form an essentially solid continuous mass between the drum 1 and the clad cover 6. Applicant has found that this results in an exceptionally satisfactory bonding of the outer stainless steel member 6 to the base member 1. It is particularly advantageous in that a very close tolerance in the roundness of the drum assemblies is maintained such that a very minimum amount of grinding is required to produce tolerance for practical application in offset printing apparatus.

During the heating process, as previously noted, the knit structure or element 12 maintains the epoxy film between the members and also establishes a very accurate spacing of the outer clad cover 6 from the inner base drum 1.

The knit structure is in accordance with an optimum construction formed of a material having a substantially higher temperature resistance than the epoxy or other binder in order to maintain its structural strength during the curing of the epoxy and subsequent processing of the drum such as grinding. Thus, the knit structure is particularly employed to accurately locate the outer clad cover 6 at a predetermined constant spacing with respect to the base drum 1 and thereby produce an essentially constant radius outer surface. The knit structure engages the facing surfaces of the drum 1 and the cover 6 to produce and maintain this relationship as long as it maintains its structural integrity. By employing a material having a substantially higher temperature, the knit structure 12 will more surely maintain the desired relationship.

After the assembling and bonding, the edges of the clamping opening and the end faces may be machined to remove the excess of the stainless steel and the woven member 12.

If, for any reason, the bond does not meet predetermined design requirements, or after the clad surface is worn to such an extent that it no longer operates properly in the printing apparatus, the stainless steel cover 6 can be removed and a new cover 6 applied to drum 1 in the manner described above. Thus, by suitable raising of the temperature of the total assembly to a sufficient level, the worn or defective clad surface can be removed. Further, the epoxy adhesive can be removed and the drum again cleaned through any desired known process for subsequent processing in accordance with the above teaching.

Applicant has thus disclosed an unusually novel and highly satisfactory means of forming a clad roller. Certain details may, of course, be chanced as required or desired. Thus, the spacing means may be of any suitable construction. For example, the epoxy film may include spacing elements distributed throughout the film structure, such as glass or iron beads within an epoxy resin. Further, rather than the preformed sheets, the epoxy may be applied with or without the spacing elements mixed therewith and with the subsequent addition of the necessary hardening agent. Obviously, any resilient pad or clamping means may be employed as long as a relatively uniform pressure distribution is maintained over the surface during the curing process. Similarly, any other means may be employed to clean the members. However, it is important to maintain the cleanliness of all surfaces in order to provide an optimum bonding between the several elements.

The present invention thus provides a highly improved method of cladding a curved metal surface with another metal member and, in particular, a highly improved means of creating a clad printing drum or cylinder.

Various modes of carrying out the invention are contemplated as being within the scope of the following claims which particularly point out and distinctly claim the subject matter which is regarded as the invention.

I claim:

1. A rigid clad drum comprising an inner rigid cylindrical self-supporting metal base member, an outer thin continuous metal cover, a thermosetting epoxy resin interposed between said base member and cover and constituting the means of firmly affixing said metal cover to said base member, and a spacing means comprising a knit-like uniform fabric including a plurality of interwoven strands of fiberglass strands and nylon strands and embedded within said adhesive in engagement with the base member and the cover to accurately locate said cover in overlying relationship to said base member with a constant spacing therebetween to accurately establish a cylindrical outer drum surface.

2. The rigid clad drum of claim 1 wherein said base member includes a peripheral opening with the thin metal cover terminating at the opening.

3. The rigid clad drum of claim 1 wherein said base member is formed of a cast metal selected from the metal group of iron and aluminum and said thin outer cover is a stainless steel member.

4. The rigid clad drum of claim 1 wherein said fabric includes a number of fiberglass strands greater than the number of nylon strands.

* * * * *